United States Patent [15] 3,657,557

Smith et al. [45] Apr. 18, 1972

[54] SYNCHRONOUS BINARY COUNTER

[72] Inventors: Kent F. Smith; Frank M. Wanlass, both of Salt Lake City, Utah

[73] Assignee: General Instrument Corporation, Newark, N.Y.

[22] Filed: Oct. 19, 1970

[21] Appl. No.: 81,902

[52] U.S. Cl. ..............................307/225, 307/208, 307/251
[51] Int. Cl. ..........................................................H03k 23/22
[58] Field of Search .............307/205, 221 C, 225, 251, 279, 307/208

[56] References Cited

UNITED STATES PATENTS 3,431,433 3/1969 Ball et al. ..............................307/221
3,483,400 12/1969 Washizuka et al. ................307/251 X

*Primary Examiner*—John S. Heyman
*Attorney*—James and Franklin

[57] ABSTRACT

A multistage synchronous binary counter has an improved high speed carry means which is responsive only to the previous stage. Each stage comprises three inverters connected in series, the first and second inverters being isolated periodically by a clocked switching device. Two feedback paths in each stage comprising two switching devices each are adapted to feed back the signals at the outputs of the second and third inverters respectively to the input node, the control terminals of said switching devices being connected to selected nodes in the preceding stage. Another clocked switching device is interposed in both feedback paths whereby each count takes place over a period defined by first and second nonoverlapping clock signals applied to the first and second clocked switching devices, respectively.

21 Claims, 3 Drawing Figures

PATENTED APR 18 1972 3,657,557

INVENTORS.
KENT F. SMITH
FRANK M. WANLASS

BY James and Franklin

ATTORNEY

SYNCHRONOUS BINARY COUNTER

The present invention relates to electronic digital computing devices and in particular to synchronous binary counters.

One of the basic building blocks of digital data processing equipment is the counter. In many digital applications the principal objective is to count a sequence of events such as the passage of charged particles through a chamber or the number of vehicles traveling a highway, each event represented by an electrical pulse. In some of these applications it is desired to present the result in decimal form. Accordingly, modern digital apparatus utilizes a vast variety of specialized electronic components and circuits, known as decimal counters, designed to perform the function of decimal counting. Where the count result need not be presented in decimal form a binary counter adapted to store and count numbers in binary form is generally employed. Binary counters of the type here considered have wide applications in digital computers primarily in count-down circuits to provide synchronous operation. Such circuits may also be used as timers in a variety of electrical and electronic apparatus. Moreover, numerous schemes have been devised for modifying a four-digit binary counter to cause the counter to recycle after 10 counts instead of 16 to thereby provide a decimal output. In either case the basic operations are the same, the number of different switching configurations performing these operations being virtually limitless. These operations are storage and carry. A decimal counter needs 10 storage elements to store 10 counts, 0–9, before the next count resets to zero again by means of a 1 carry. A binary counter on the other hand need store only two digits, represented by the logical 0 and 1, in any column. A single binary storage device such as a flip-flop is generally employed for this purpose. A typical binary counter consists of several stages connected in cascade each having a one-digit storage device. The successive count pulses are applied to the first stage or "ones" column storage device. Incoming pulses alternately set this stage to 1 and reset it to 0. On each reset pulse this stage emits a carry signal to the next stage or "twos" column storage device. Thus, the second stage alternates between 0 and 1 every second input count, in turn issuing a carry pulse to the next stage every time it resets to zero (every fourth input pulse), and so on for successive stages.

It will be apparent that since each counter stage requires a finite time to change state, it may take a significant time delay before the final stage receives its carry pulse, particularly when more than a few stages are involved. In a 15-column binary counter, for example, this propagation delay may be in the order of several microseconds. Accordingly, the speed of carry propagation is an important design factor in counters used in high speed digital applications.

Various circuit arrangements usually employing AND gates have been designed to improve carry speed. In a typical arrangement, the carry signals from all previous stages are combined as inputs to an AND gate, the output of which is adapted to set that stage. The input count pulse is thus adapted to set all required stages simultaneously and propagation delay is thus minimized. However, a severe disadvantage of these arrangements is that as the number of stages increases the number of inputs to the AND gates increases, necessitating an increase in fan-in-requirement. This fan-in requirement may be met by the use of multi-level "tree" arrangements but here again propagation delay lowers attainable speed. Moreover, the space requirements for such circuits renders them extremely costly to manufacture and use.

In modern industrial, commercial, and home electronic equipment cost is a major consideration. In recent years low cost large scale integration techniques have been given impetus by the development of MOS (Metal Oxide Silicon) technology. This is a result of the ability of MOS technology to integrate more functions on a given chip and to give consistently type—processing yields than conventional bipolar technology. Accordingly many of today's integrated arrays of the type employing binary counters comprise MOS circuits.

MOS binary counters are generally of the synchronous type–that is, all stages are adapted to stabilize during a given clock pulse. The counting thus proceeds at a given frequency controlled by synchronous clock pulses as opposed to an asynchronous uncontrolled ripple.

One example of this type of counter is that employing a series of MOS master-slave flip-flops controlled by common clock pulses. These circuits are rather complex, space consuming and present a significant layout problem to the integrated circuit designer. A simpler design involves the use of a loop comprising a plurality of inverters and isolating clocked FETs. Application of clock pulses to the clocked FETs serves to set and reset each stage to the 0 and 1 logic states respectively. A significant drawback of this arrangement is that the clock signals for each stage must be separately generated by the output of the previous stage, necessitating the provision of a large complex clock generator for each stage. Again the manufacturing cost and the size of such counter circuits are significant drawbacks particularly when a counter having a substantial number of stages is required.

Accordingly it is a primary object of the present invention to design a high speed synchronous binary counter which is inexpensive to manufacture and takes up very little chip space.

It is another object of the present invention to provide a multistage synchronous binary counter wherein each stage is adapted to oscillate between first and second stable logic configurations, the transition being made during two complementing clock pulses.

It is yet another object of the present invention to provide a multistage synchronous binary counter, each stage comprising a loop having a plurality of inverters, the operative nodes in all stages changing logic state in accordance with the logic state of the previous stage during a common clock pulse.

It is still another object of the present invention to design an MOS binary counter wherein each stage comprises a minimum number of MOS switching devices adapted to switch when dictated by a common clock signal.

To these ends the binary counter of the present invention comprises a plurality of stages each comprising a series of inverters connected in series between an input node and an output node. A clocked FET is connected in series between the first and second inverters to provide signal isolation during one clock interval (hereinafter termed Φ2 time). A first feedback path comprising two series connected FETs is provided between the output and input nodes to complete the operative circuit loop. A second feedback path comprising two parallel connected FETs is provided between the output of the second inverter and the input node and serves to stabilize the input signal. Another clocked FET is interposed in both feedback paths to isolate the input node from the output node during another nonoverlapping clock interval (hereinafter termed Φ1 time). The control terminals of the feedback FETs are connected to selected nodes in the preceding stage to provide toggling when the previous stage is reset to zero.

To the accomplishment of the above and to such other objects as may hereinafter appear, the present invention relates to a multistage synchronous binary counter as defined in the appended claims and as described in this specification taken together with the accompanying drawings in which:

Figure 1:
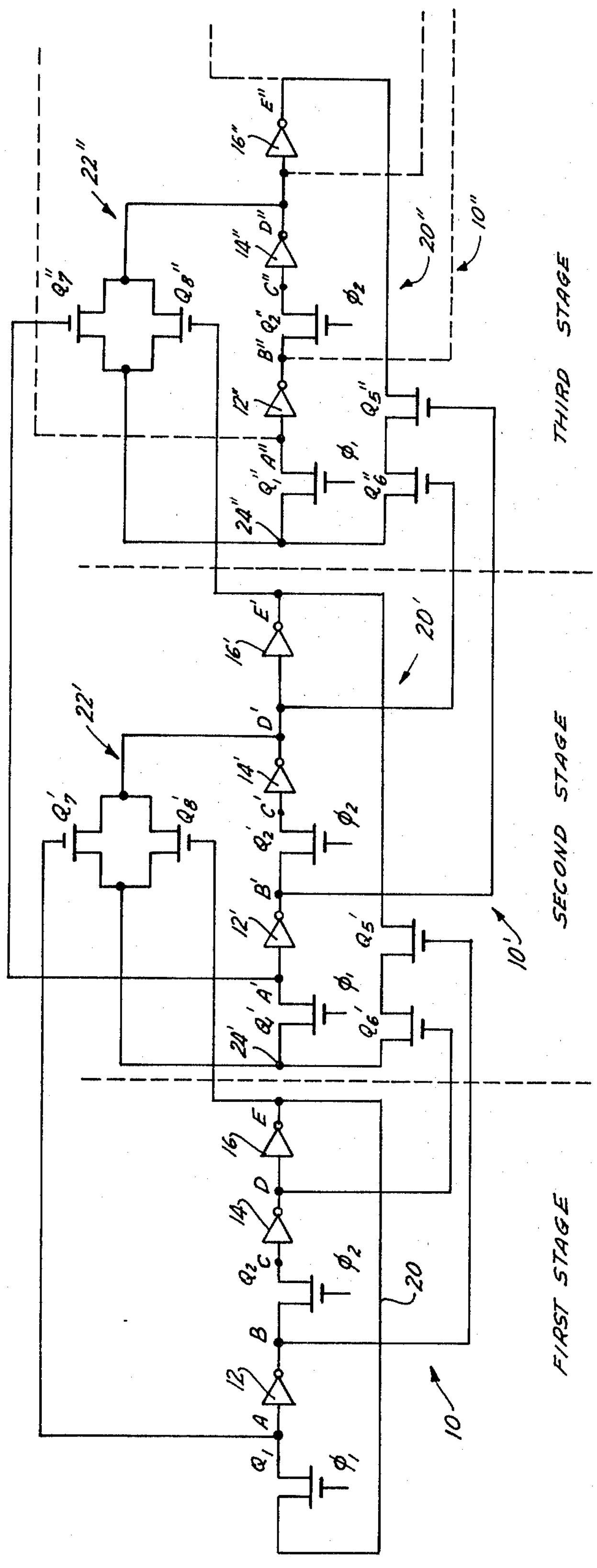
FIG. 1 is a circuit diagram of the first three stages of the synchronous binary counter of the present invention.

Referring to FIG. 1, the first three stages 10, 10′ and 10″, respectively, of the binary counter of the present invention are there illustrated, like circuit elements being designated by like reference designations with the addition of a prime for the second stage and a double prime for the third stage. The first stage 10 is adapted to toggle between the 0 and 1 logic states after each complete clock cycle, toggling of the second and third stages being controlled by the logic condition of the previous stage. It will be appreciated that subsequent stages are identical to the second and third stage and thus are not illustrated.

The first stage 10 comprises a complete circuit loop having five circuit elements connected in series. A first FET Q1 has one of its output circuit terminals connected to the input of a first inverter generally designated 12. A second FET Q2 has its output terminals connected in series between the output of inverter 12 and the input to a second inverter generally designated 14. A third inverter generally designated 16 is connected in series with inverter 14, its input receiving the output of inverter 14 and its output being fed back along path 20 to the other output circuit terminal of FET Q1 to complete the loop.

Figure 3:
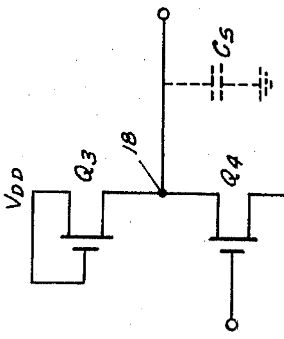
FIG. 3 is a circuit diagram of a typical MOS inverter adapted for use in the circuit of FIG. 1.
Figure 2:
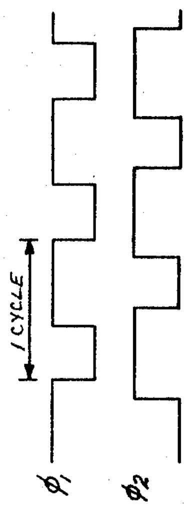
FIG. 2 is a graphical illustration of the complementary clock pulses used to synchronize the circuit of FIG. 1.

Inverters 12, 14 and 16 may comprise any logic circuit adapted to perform the inversion function and may be the standard MOS inverter circuits of the type illustrated in FIG. 3. As there shown two FETs, Q3 and Q4, are connected in series across a supply voltage $V_{DD}$. FET Q3 functions as a load resistor and has its gate terminal returned to its drain. FET Q4 is the driver device and receives the input signal at its gate terminal. The output is taken off the junction 18 of the output circuits of FETs Q3 and Q4. $C_s$ represents the stray capacitances of the devices directly connected to node 18. The resistance of the load device Q3 is typically a factor of 10 greater than that of the driver device Q4. Since the control voltage (gate to source) of FET Q3 is modulated by the output (source) voltage at 18, FET Q3 functions as a nonlinear resistor whose value increases as the voltage across $C_s$ increases. It will be apparent that when the input is at ground (logic 0) $C_s$ will be charged negative (logic 1) through FET Q3, nonconductive FET Q4 isolating the output from ground. Conversely, a negative input at the gate of FET Q4 will render it conductive to discharge $C_s$ near ground. If low power consumption is desired, a conventional complementary MOS inverter structure may be utilized. In either case, it should be noted is rendered nonconductive. The input signal at node A is inverted three times and thus the output at node E, after proper functioning of the system, is the complement of the signal at node A, these nodes being isolated by nonconductive FET Q1. When Φ1 goes negative the node capacitance at node A is charged or discharged to the complementary logic level at E by the output of inverter 16 via conductive FET Q1. Likewise the logic of node B is changed via inverter 12. Nodes C, D and E, however, remain at their existing logic levels since they are isolated from node B by FET Q2 which has been rendered nonconductive by clock signal Φ2. In this manner it will be apparent that all nodes A-E of the first stage alternate between the 0 and 1 logic states at a frequency of one clock cycle. Thus, counting proceeds at the pace of one count per clock cycle.

The second stage 10' comprises a circuit loop identical to that of stage 10 with the exception that two FETs Q5' and Q6' are interposed in series in the feedback path generally designated 20' between the output of inverter 16' and the input of FET Q1'. In addition a second feedback circuit generally designated 22' is provided comprising FETs Q7' and Q8' having their output circuit terminals connected in parallel between the output of inverter 14' and the input of FET Q1'. The junction of the two feedback paths 20' and 22' is node 24'. The control terminals of FETs Q5' and Q6' are connected to nodes B and D, respectively, of stage 10, while the control terminals of FET Q7' and Q8' are connected to nodes A and E, respectively, of stage 10.

The operation of the counter circuit will now be specifically described with reference to FIG. 1 and the following table, which indicates the logic configuration of the three stages as counting proceeds from the given o clock cycle state, the applicable clock cycle and phase being indicated in the first two columns, respectively:

TABLE 1

| Clock cycle | Clock phase | A | B | C | D | E | A′ | B′ | C′ | D′ | E′ | A″ | B″ | C″ | D″ | E″ |
|---|---|---|---|---|---|---|---|---|---|---|---|---|---|---|---|---|
| 0 | $\phi1$ | 0 | 1 | 0 | 1 | 0 | 0 | 1 | 0 | 1 | 0 | 0 | 1 | 0 | 1 | 0 |
| | $\phi2$ | 0 | 1 | 1 | 0 | 1 | 0 | 1 | 1 | 0 | 1 | 0 | 1 | 1 | 0 | 1 |
| 1 | $\phi1$ | 1 | 0 | 1 | 0 | 1 | 0 | 1 | 1 | 0 | 1 | 0 | 1 | 1 | 0 | 1 |
| | $\phi2$ | 1 | 0 | 0 | 1 | 0 | 0 | 1 | 1 | 0 | 1 | 0 | 1 | 1 | 0 | 1 |
| 2 | $\phi1$ | 0 | 1 | 0 | 1 | 0 | 1 | 0 | 1 | 0 | 1 | 0 | 1 | 1 | 0 | 1 |
| | $\phi2$ | 0 | 1 | 1 | 0 | 1 | 1 | 0 | 0 | 1 | 0 | 0 | 1 | 1 | 0 | 1 |
| 3 | $\phi1$ | 1 | 0 | 1 | 0 | 1 | 1 | 0 | 0 | 1 | 0 | 0 | 1 | 1 | 0 | 1 |
| | $\phi2$ | 1 | 0 | 0 | 1 | 0 | 1 | 0 | 0 | 1 | 0 | 0 | 1 | 1 | 0 | 1 |
| 4 | $\phi1$ | 0 | 1 | 0 | 1 | 0 | 0 | 1 | 0 | 1 | 0 | 1 | 0 | 1 | 0 | 1 |
| | $\phi2$ | 0 | 1 | 1 | 0 | 1 | 0 | 1 | 1 | 0 | 1 | 1 | 0 | 0 | 1 | 0 |

TABLE NO. 1 that the inverter exhibits an extremely high input impedance at the input gate.

Referring again to FIG. 1, for convenience each node of stage 10 has been designated by a letter. Thus A designates the node between FET Q1 and inverter 12, B the output node of inverter 12, C the input node of inverter 14, D the output node of inverter 14, and E the output node of inverter 16. Again it should be noted that the interelectrode capacitances of the devices connected to each node result in a stray node capacitance upon which the logic signal is impressed. Modes B, D and E are so connected in the circuit that they can be loaded or unloaded with no change in the state of their associated inverters.

FET Q1 receives clock signal Φ1 at its gate terminal and FET Q2 receives clock signal Φ2 at its gate terminal. Clock signals Φ1 and Φ2 together define a complete clock cycle and may comprise any nonoverlapping clock pulses of a pulse width sufficient to accommodate a one count carry delay. The carry delay depends upon the number of stages. Clock pulses Φ1 and Φ2 cannot both be negative at the same time, and there must be at least an instant in each cycle when they are both at ground at the same time. For maximum speed, the time when they are both at ground should be minimized, and may become vanishingly small. ("Ground" represents that signal which causes the switches to be off, and "negative" represents that signal which causes the switches to be on.)

When Φ2 (or Φ1) is negative, FET Q2 (or Q1) is rendered conductive and when Φ2 (or Φ1) is positive, FET Q2 (or Q1)

While it will be hereinafter apparent that any of nodes A through E may be used as the operative count node in each stage, it will be recalled that the inverter output nodes (B, D and E) are capable of holding a fixed voltage, or of driving a load without changing states, and thus the output is preferably taken off one of these nodes.

All stages are arbitrarily initially set to the logic condition shown in the first row of the above table during Φ1 time. In this configuration, the 0 signal at node C is inverted by inverter 14 resulting in a 1 signal at node D. The 1 signal at nodes D is inverted by inverter 16 to a 0 at node E and fed back to node A via conductive FET Q1. Inverter 12 thus generates the 1 signal at node B. Nonconductive FET Q2 serves to isolate the 1 at node B from the 0 at node C, thus maintaining the stable 0 1 0 1 0 configuration. The same analysis applies to stages 10', 10'' and all subsequent stages. Thus, the 1 logic of nodes B and D render FETs Q5' and Q6' conductive to close the feedback path 20' and the 0 logic at nodes A and E render both FETs Q7' and Q8' nonconductive to thereby open feedback path 22'. In this manner all stages are stabilized in the 0 1 0 1 0 logic configuration.

During Φ2 time the 1 signal at node B is transmitted via conductive FET Q2 to node C, inverted to a 0 by inverter 14 at node D, and again inverted to 1 by inverter 16 at node E. Nodes A and B remain at their existing logic stages because the 0 at node A is isolated from the 1 at node E by nonconductive FET Q.

The same process occurs in subsequent stages, the 1 output at node E', for example being isolated from the 0 signal at node A' by nonconductive FETs Q1' and Q5' (which receives the 0 signal from node B at its gate terminal).

At the onset of Φ1 time of clock cycle 1 (corresponding to the first count), it will be apparent that the 1 signal at node E will be fed back to node A via conductive FET Q1 in stage 10. Node B will, accordingly, change from the 1 to the 0 logic state as a result of the inverter action of inverter 12. Nodes C, D and E, however, will remain at their original logic conditions as a result of their isolation from nodes A and B due to nonconductive FET Q2.

Since both nodes B and D in the first inverter stage 10 are now at the 0 logic level, FETs Q5' and Q6' in feedback path 20' of stage 10' will be rendered nonconductive. Accordingly, the 1 output at E' will remain effectively isolated from the 0 signal at node A'. Moreover, since nodes A and E of stage 10 are now in the logic 1 condition, FETs Q7' and Q8' in feedback path 22' of stage 10' will both be rendered conductive and together with conductive FET Q1' will be effective to feed back the 0 signal at node D' to node A', thereby stabilizing node A' in the 0 logic condition. With regard to stage 10'', the 1 output at node E'' remains isolated from node A'' by nonconductive FET Q6'' which receives the 0 signal from node D' at its gate terminal. Moreover, FET Q8'' remains conductive to provide, together with conductive FET Q1'', a conductive feedback path 22'' from node D'' to node A'', thereby stabilizing node A'' at the 0 logic condition.

It will be apparent from the foregoing that during Φ1 time, stages 10' and 10'' and all subsequent stages remain stabilized in the 0 1 1 0 1 logic configuration. 37 During Φ2 time, FET Q2 is rendered conductive thereby transmitting the 0 signal at node B to node C at the input to inverter 14. Accordingly, node D changes to a 1 and node E changes to a 0, nonconductive FET Q1 maintaining isolation between nodes A and E. However, because node B remains in the 0 logic state and node A remains in the 1 logic state, FET Q5' remains nonconductive, continuing to isolate node E' from node A' and FET Q7' remains conductive closing feedback path 22' to continue to stabilize node A' in the 0 logic condition. Likewise stage 10'' and subsequent stages remain in this 0 1 1 0 1 logic configuration since the inputs to the gate terminals of the feedback FETs Q5'', Q6'', Q7'' and Q8'' remain identical.

At the onset of Φ1 time of clock cycle 2 (corresponding to the second count) stage 10 again changes configuration at nodes A and B as a result of the closing of the feedback path from output node E to input node A by conductive FET Q1. Since FET Q2 is nonconductive during Φ1 time nodes C, D and E again are isolated from nodes A and B and remain in their existing logic conditions. It will be seen that stage 10 has now returned to the 0 1 0 1 0 configuration. Accordingly, since nodes B and D in stage 10 are now both at logic 1 the feedback path 20' between output node E' and input node A' of the second stage 20' is closed via conductive FETs Q5', Q6' and Q1'. At the same time, since nodes A and E in stage 10 are now both in the 0 logic condition, FETs Q7' and Q8' are rendered nonconductive thereby opening the feedback path between node D' and A'. Accordingly, node A' changes from a 0 to a 1 logic condition and node B' changes from a 1 to a 0 logic condition, nodes C', D' and E' remaining in their existing logic conditions as a result of nonconductive isolating FET Q2'. The third stage 10'', however, remains in its existing logic configuration since FETs Q5'' and Q6'' are rendered nonconductive by the 0 signals at nodes B' and D' respectively, and FETs Q7'' and Q8'' are rendered conductive by means of the 1 signal at nodes A' and E' respectively.

During Φ2 time of cycle 2 the logic at nodes C, D and E are again changed resulting in the 0 1 1 0 1 configuration in a manner identical to the change during Φ2 time of the zero clock cycle. At the same time nodes C', D' and E' of second stage 10' also change state as a result of the conduction between nodes B' and C' through FET Q2. Again, however, the third stage 10'' remains in its existing logic configuration as a result of non-conductive FET Q5'' which receives the 0 signal from node B' at its gate terminal, thereby continuing to isolate the 1 output at node E'' from the 0 signal at node A''.

At the onset of Φ1 time of the third clock cycle, the logic at nodes A and B is again changed as shown in the table in a manner identical to that occurring at the onset of the clock cycle 1. Once again, however, second stage 10' remains in its existing logic configuration as a result of nonconductive FETs Q5' and Q6' in feedback path 20' and conductive FETs Q7' and Q8' in feedback path 22'. As a result, stage 10'' and subsequent stages also remain in their existing logic configurations (because the inputs to the feedbacks FETs do not change).

During Φ2 time of cycle 3 nodes C, D and E of stage 10 again change logic state in a manner identical to that described with respect to Φ2 time of clock cycle 1. Since node B remains at 0 logic, feedback path 20' remains open as a result of nonconductive FET Q5' and node A' remains isolated from node E'. Accordingly, stage 10' and all succeeding stages again remain in their existing logic configurations.

At the onset of clock cycle 4, stage 10 again changes to the 0 1 0 1 0 configuration in a manner which will now be familiar. As a result, stage 10' is now adapted to toggle since both FETs Q5' and Q6' in feedback path 20' are rendered conductive by virtue of the 1 logic signal at nodes B and D of stage 10. Moreover, both FETs Q7' and Q8' of feedback path 22' are rendered nonconductive by the 0 signal at nodes A and E respectively, thereby isolating node D' from node A'. Accordingly, the 0 signal at node E' is fed back to the input of inverter 12' at node A', resulting in a change on logic state at nodes A' and B'. However, nodes C', D' and E' remain in their existing logic states as a result of nonconductive isolating FET Q2'. It will be apparent that stage 10' is now also in the 0 1 0 1 0 configuration which it will now be observed is the configuration necessary to toggle the next stage. Thus FETs Q5'' and Q6'' are both rendered conductive and FETs Q7'' and Q8'' are both rendered nonconductive. The 1 signal at node E'' is accordingly fed back to node A'' and nodes A'' and B'' thus change logic state, nodes C'', D'' and E'' remaining in their existing logic states as a result of nonconductive isolating FET Q2''.

During Φ2 time of cycle 4 nodes C, D and E again change state as a result of conductive FET Q2. At the same time nodes C', D' and E' of second stage 10' also change state as a result of the conduction between nodes B' (at logic 1) and C' (formerly at logic 0) through FET Q2'.

Finally, because stage 10'' is now in the 1 0 1 0 1 condition, as a result of the toggle during Φ1 time, nodes C'', D'' and E'' are now adapted to change state by virtue of the conduction of the 0 signal at node B'' to node C'' by conductive FET Q2''.

It will be apparent from the foregoing analysis that each stage has only four stable logic configurations, namely:

a. 0 1 0 1 0
b. 0 1 1 0 1
c. 1 0 1 0 1
d. 1 0 0 1 0

Moreover, logic states (a) through (d) occur in all stages in the order in which they have been listed. Referring to stage 10, it will be seen that logic configuration (a) is only stable during Φ1 time as a result of the isolation between nodes B and C. This configuration thus remains in any stage for only one clock pulse, Φ1. During the second half of that clock cycle (Φ2 time) configuration (a) changes to configuration (b) since FET Q2 becomes conductive and FET Q1 maintains isolation between nodes E and A.

The same analysis may be applied to the (c) logic configuration. Thus if a stage is in the (c) configuration during Φ1 time, it will automatically revert to the (d) configuration during Φ2 time of the same clock cycle. It will be apparent that this analysis holds for all stages regardless of the configuration of the previous stage. With regard to the transition from configuration (b) to configuration (c) and from configuration (d) back to configuration (a), however, the situation will depend upon the configuration of the previous stage which controls the conductivity of the feedback FETs. As already noted, since the first stage 10 contains no feedback FETs, these transitions take place immediately upon the onset of the next half clock cycle (Φ1 time) as a result of the feedback from node E to node A via FET Q1. It will be apparent, however, that stage 10', 10'' and all subsequent stages must await the appearance of the (a) configuration at the previous stage before it is adapted to toggle. This is because only the (a) configuration (0 1 0 1 0) in the previous stage will render both feedback FETs (Q5' and Q6', Q5'' and Q6'' . . . ) in the lower feedback stage (20', 20'' . . . ) conductive thereby to transfer the 1 logic (configuration (b)) or the 0 logic (configuration (d)) at the output node (E', E'' . . . ) to the input node (A', A'' . . . ). Moreover, only the (a) configuration in the previous stage is adapted to render both feedback FETs (Q6' and Q7', Q6'' and Q7'' . . . ) in the upper feedback path (22', 22'') nonconductive to isolate node D' (D'' . . . ) from node A' (A'' . . . ) thereby to stabilize the input node (A',A'') at the same logic state as that of the output node (E', E'' . . . ).

Since the (a) configuration appears at stage 10 every fourth clock pulse (i.e., two Φ1 pulses and two Φ2 pulses or every other complete clock cycle), stage 10' will toggle to the (a) or (c) configurations every fourth clock pulse, remain in such configuration for one clock pulse (Φ1 time), and revert to the stable (b) or (d) configurations, respectively, during the next clock pulse (Φ2 time). It then remains in the (b) or (d) configuration for three additional clock pulses at which time (Φ1 time) stage 10 has again reverted to the (a) configuration and stage 10' accordingly toggles to the (c) or (a) configuration, respectively, and then to the (d) or (b) configuration, respectively during the next clock pulse. In this manner stage 10' toggles between the stable (b) and (d) configurations at a frequency of two clock cycles. It will be noted that the stable (b) and (d) configurations are exact complements of each other so that the alternate stable logic states corresponding to the (b) and (d) configurations will be complementary regardless of which node is utilized as the operative count node. Moreover, the transition configurations (a) and (c) are also exact complements of each other. Thus the logic at the count node during either the transition clock pulse into or out of the stable configuration will be identical with the logic at the count node during such stable configuration regardless of the node selected. Accordingly, each node in stage 10' oscillates between the 0 and 1 logic states, remaining in each state for four clock pulses (two complete clock cycles).

By a similar analysis, it can be shown that each node of stage 10'' oscillates between the 0 and 1 logic states at a frequency of eight clock pulses (four complete clock cycles.) By way of illustration, if node D is taken as the operative count node, it will now be observed with reference to Table 1 that the output count proceeds as follows:

STAGE

| Cycle | 10 | 10' | 10'' |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |

TABLE NO. 2

This sequence will be recognized as the binary number system, where stages 10, 10' and 10'' correspond to the "ones," "twos" and "fours" columns, respectively. In the event a decimal output is required any of the conventional schemes for causing a four-stage binary counter to reset after 10 instead of 16 counts may be utilized with the circuit described herein.

The synchronous binary counter described herein is relatively inexpensive to manufacture. Moreover, the number of switching devices required has been considerably reduced as a result of the use of feedback paths rather than direct connection between the output of one stage and the input of the succeeding stage.

In addition, this arrangement considerably facilitates the layout of the devices on an integrated circuit chip.

Finally, the use of the feedback arrangement herein described completely eliminates the necessity of a separate clock generator for each stage thus reducing size, power consumption and additional propagation delay.

While only one embodiment of the present invention has herein been specifically described, many variations may be made therein, all within the scope of the present invention as defined in the following claims.

We claim:

1. A multi-stage synchronous binary counter wherein each stage comprises an input node at one of a first or second signal level representing first and second logic levels, respectively, said signal levels being the complements of each other, an output node, signal generating means operatively connected to said input node and said output node and adapted, during a first interval, to generate at said output node the complement of the signal at said input node, feedback means operatively connected to the previous stage for feeding back the signal at said output node to said input node during a second interval nonoverlapping with said first interval when the signals at the input node and output node of the previous stage are both at said first signal level, and means operatively connected to the previous stage for impressing the complement of the signal at said output node on said input node during said second interval when the input node and/or the output node of said previous stage is at said second signal level.

2. The binary counter of claim 1, wherein said signal generating means comprises first, second and third inverter means connected in series between said input node and said output node thereby to thrice invert the signal at said input node, and means connected between said first and second inverter means for isolating the output of said first inverter means from the input of said second inverter means during said first interval.

3. The binary counter of claim 2, wherein said isolating means comprises a clocked switching device connected in series between said first and second inverter means.

4. The binary counter of claim 1, wherein said feedback means comprises first and second switching devices having their output circuit terminals connected in series between said output node and said input node, the control terminal of said first switching device being connected to the output of the first inverter means of the previous stage, the control terminal of said second switching device being connected to the output of said second inverter means of the previous stage, and second isolating means for isolating said input node from said output node during said first interval.

5. The binary counter of claim 4, wherein said second isolating means comprises a clocked switching device connected in series with said first and second switching devices.

6. The binary counter of claim 2, wherein said impressing means comprises second feedback means connected between the output of said second inverter means and said input node.

7. The binary counter of claim 6, wherein said second feedback means comprises first and second switching devices connected in parallel between the output of said second inverter means and said input node, the control terminal of said first switching device being connected to the input node of the previous stage, the control terminal of said second switching device being connected to the output node of said previous stage, and second isolating means for isolating said input node from said output of said second inverter means during said second interval.

8. The binary counter of claim 4, wherein said second isolating means comprises a clocked switching device connected in series with said first and second switching devices.

9. The binary counter of claim 4, wherein said switching devices are field effect transistors.

10. The binary counter of claim 5, wherein said switching devices are field effect transistors.

11. The binary counter of claim 7, wherein said switching devices are field effect transistors.

12. The binary counter of claim 4, wherein said impressing means comprises second feedback means connected between the output of said second inverter means and said input node.

13. The binary counter of claim 12, wherein said second feedback means comprises third and fourth switching devices connected in parallel between the output of said second inverter means and said input node, the control terminal of said third switching device being connected to the input node of the previous stage, the control terminal of said fourth switching device being connected to the output node of said previous stage, and third isolating means for isolating said input node from said output of said second inverter means during said second interval.

14. The binary counter of claim 13, wherein said second and third isolating means comprise a single switching device connected in series with said first and second feedback means.

15. The binary counter of claim 12, wherein said switching devices are field effect transistors.

16. The binary counter of claim 13, wherein said switching devices are field effect transistors.

17. The binary counter of claim 14, wherein said switching devices are field effect transistors.

18. A multi-stage synchronous binary counter wherein each stage comprises an input node and an output node, first, second and third inverter means connected in series between said input node and said output node thereby to thrice invert the signal at said input node, means connected between said first and second inverter means for isolating the output of said first inverter from the input of said second inverter means during a given interval, a first feedback path between said output node and said input node and a second feedback path between the output of said second inverter means and said input node, and one or more switching devices having their output circuits interposed in each of said first and second feedback paths.

19. The binary counter of claim 18, wherein said first feedback path comprises first and second switching devices having their output circuit terminals connected in series between said output node and said input node.

20. The binary counter of claim 19, wherein said second feedback path comprises third and fourth switching devices connected in parallel between the output of said second inverter means and said input node.

21. The binary counter of claim 18, wherein said second feedback path comprises first and second switching devices connected in parallel between the output of said second inverter means and said input node.

* * * * *